INVENTORS
WALTER ERNST
IRA B. LAWYER
BY
Toulmin & Toulmin
ATTORNEYS

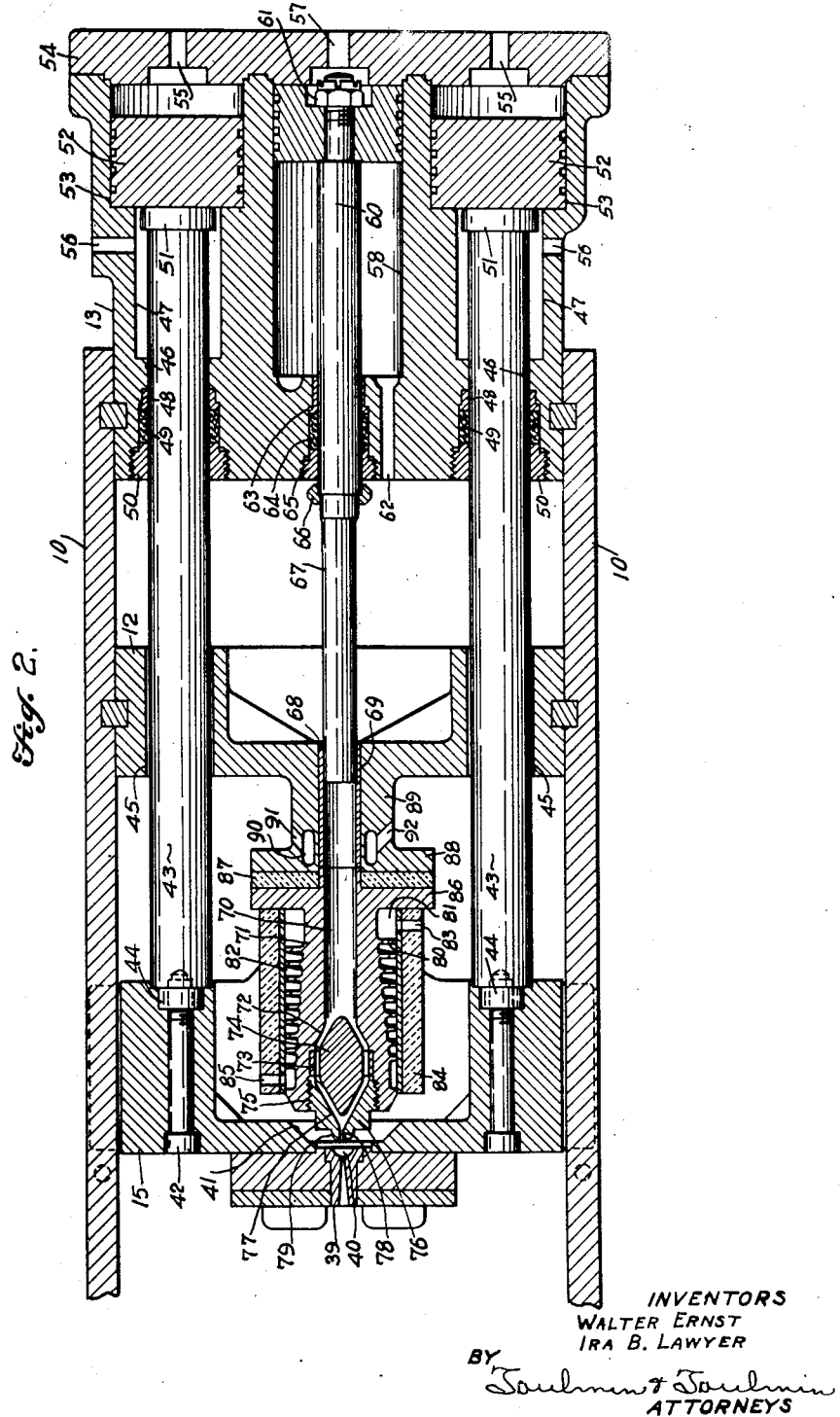

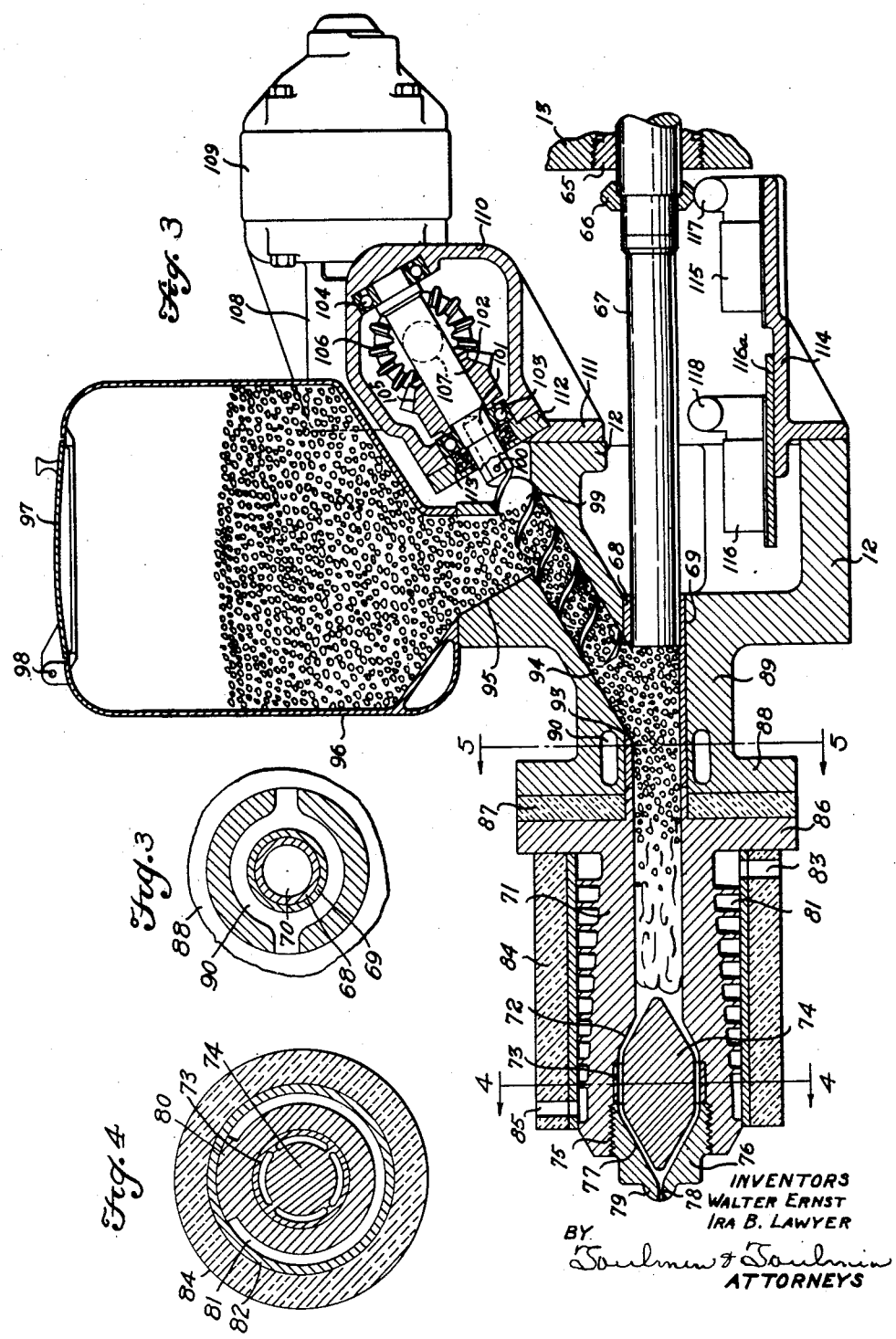

Patented Dec. 30, 1941

2,268,026

UNITED STATES PATENT OFFICE 2,268,026

FEEDING MEANS FOR MOLDING PRESSES

Walter Ernst and Ira B. Lawyer, Mount Gilead, Ohio, assignors to The Hydraulic Press Corp. Inc., Wilmington, Del., a corporation of Delaware Original application April 26, 1937, Serial No. 138,904. Divided and this application October 12, 1937, Serial No. 168,614

10 Claims. (Cl. 18—30)

This invention relates to presses, and in particular, to plastic extrusion molding presses for forming articles of plastic material.

It is an object of this invention to provide a plastic extrusion molding machine having positively actuated force feed devices employing a screw for positively feeding the plastic material into the injector.

Another object is to provide a plastic extrusion molding machine, wherein the positive feeding screw is actuated by a motor, which in turn, is responsive to the operation of limit switches actuated by the injection plunger and controlled by timing means in such a manner as to cause a predetermined amount of plastic material to be fed into the injector.

Another object is to provide a motor-operated feeding mechanism, as described in the preceding paragraph, wherein the motor and limit switches cooperate to feed slightly more than the necessary amount of plastic material into the injector, and automatically skip a feeding stroke when an excess of material gathers within the injector, thereby insuring that an adequate supply of material is always present for injection by the injector.

Another object is to provide a feeding mechanism for a plastic extrusion molding machine, this mechanism employing a feeding screw actuated by gearing from a motor unit in such a manner that the motor unit may be readily detached from the feeding screw so as to enable the easy cleaning of the feeding screw.

Another object is to provide a feeding mechanism, as described in the preceding paragraph, wherein a shear pin is provided in the feeding screw mechanism so as to shear off in the event of jamming of the machine, and thereby to prevent breakage of other parts of the machine.

This is a division of our copending application, Ser. No. 138,904, filed April 26, 1937.

In the drawings:

Figure 2 is an enlarged view of the right-hand end of the machine shown in Figure 1.

Figure 3 is a vertical section along the line 3—3 in Figure 2, showing the feeding mechanism for the injection material.

Figure 4 is a cross section through the forward end of the injection or extrusion chamber, taken along the line 4—4 in Figure 3.

Figure 5 is a cross section through the rearward end of the injection or extrusion chamber, showing the cooling passages for preventing the premature softening of the plastic material, taken along the line 5—5 in Figure 3.

General arrangement

In general, the plastic extrusion machine of this invention consists of a pair of dies, one of which is moved by a plurality of hydraulic plungers into engagement with the other, one plunger providing a booster or rapid traverse speed and the other providing a slower or more powerful clamping effect. The other die is mounted upon cushioning plungers which are separable from cushioning pistons, the latter not being engaged until the plungers have moved back a predetermined distance. A hydraulic circuit is arranged to control these various hydraulic elements (shown in Figure 1). The feeding and injecting mechanism shown in Figure 3, and on a smaller scale in Figure 1, consists of a heated injection chamber having a power-operated feeding screw for feeding the granular plastic material into the injector. The feeding screw is operated by a motor which is timed by a timing device, the latter in turn being controlled by the actuation of limit switches operated in response to the reciprocation of the injection plunger.

Molding machine construction

Figure 1:
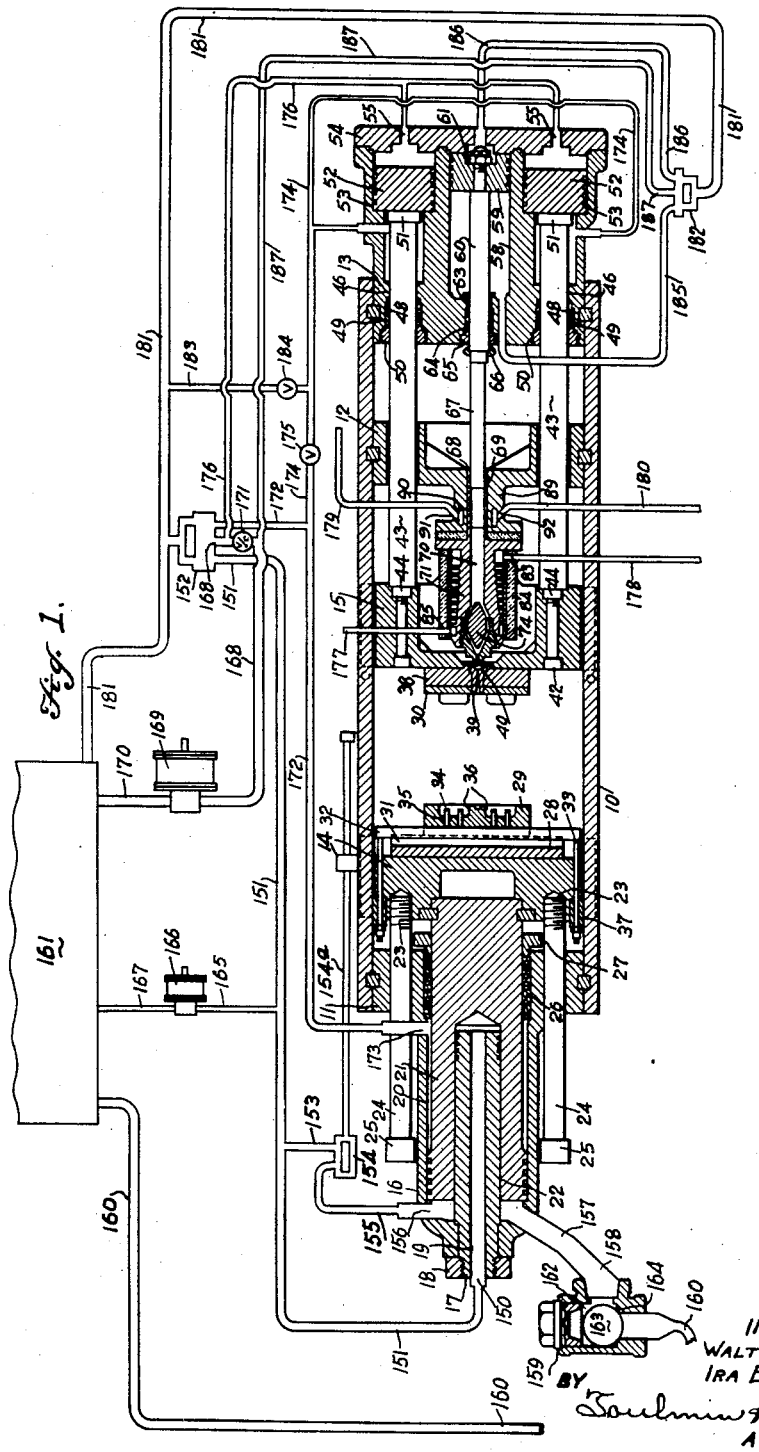
Figure 1 is a substantially horizontal section through the plastic extrusion molding machine of this invention, showing the hydraulic circuit.

The molding machine portion is shown in Figure 1, in diagrammatic form, certain of the purely mechanical and frame elements being omitted for clearness of showing. The molding portion consists, in general, of strain rods 10 having cross members 11, 12 and 13, fixedly mounted thereon from left to right. The strain rods 10 also serve to guide the die carrier 14 and die head 15 in their reciprocating motion, as hereinafter described in detail.

Mounted upon the cross member 11 is a hydraulic cylinder 16 with an inwardly extending hollow plunger 17 mounted in the outer end thereof, and secured thereto as by the nut 18. The hollow plunger 17 is provided with a bore 19. The cylinder 16 is provided with a bore 20, within which reciprocates a main plunger 21, of double-acting form, and having an internal bore 22 therein. The bore 22 serves as a cylinder bore for receiving the hollow plunger 17, and communication therewith is established through the hollow bore 19 in the hollow plunger 17. The hollow plunger 17 cooperates with the internal bore 22 of the main plunger 21 to provide a rapid traverse action of the latter, after which the main plunger itself is actuated by fluid within the bore 20 of the main cylinder 16.

On the right-hand end of the main plunger 21 is mounted the die carrier 14, the latter having threaded sockets 23 for the reception of the threaded limit rods 24, having heads 25 on the opposite ends thereof. The limit rods 24 serve to engage the cross member 11 and limit the stroke of the die carrier 14 and main plunger 21 in the event that the dies are omitted and the machine started while in that condition. The cylinder bore 20, at its outer end, is provided with a packing 26, compressed by a gland 27 for preventing the escape of fluid around the main plunger 21.

Mounted on the die carrier 14 is a die support 28 carrying a die 29, which forms one-half of a die assembly, the other half consisting of the oppositely disposed die 30. The die support 28 is provided with a channel 31 for receiving the knock-out bar 32, actuated by the rods 33 connected to the ends thereof when these rods engage the cross member 11 on the return stroke of the main plunger 21, after the completion of a molding operation. The pins 34 are mounted on the knock-out bar 32 and pass through the holes 35, into the die cavities 36 of the die 29, when the knock-out position is reached (Figure 1). Adjustable stops 37, mounted on the strain rods 10, serve to engage the die carrier 14 and prevent it and the main plunger 21 from traveling further to the left than is required to open the dies 29 and 30 and eject the molded article. This arrangement saves time in opening and closing the dies 29 and 30.

The die 30 is mounted upon a die support 38 (Figures 1 and 2), both being bored centrally to admit an injection tube 39 having an injection socket 40 at its right-hand end. The die support 38 is mounted upon the die head 15, which as previously stated, is slidably mounted for guidance along the strain rods 10. The die head 15 is centrally provided with an aperture 41, permitting the injection mechanism to approach and engage the socket 40. The die head is bored to receive bolts 42, the threaded ends of which are threaded into cushioning rods 43 engaging sockets 44 in the die head 15. The opposite ends of the cushioning rods 43 pass through bores 45 in the cross member 12, and likewise through bores 46 in the cross member 13, terminating in the cylinder bores 47. The bores 46 are closed by packings 48 and 49, compressed by the glands 50.

The right-hand ends of the cushioning rods 43 are enlarged, as at 51, and engage cushioning pistons 52, but are not otherwise connected thereto. The cushioning pistons 52 are movable independently of the cushioning rods 43, and reciprocate within cylinder bores 53 which are coaxial with and substantially form enlargements of the cylinder bores 47. The outer ends of the cylinder bores 53 are closed by an end plate 54 having ports 55 therein for the admission of pressure fluid to the cylinder bores 53. Similarly, the cylinder bores 47 are provided with ports 56 for a similar purpose. The end plate 54 is provided with a central port 57, serving to admit pressure fluid to a central cylinder 58, within which a piston head 59 reciprocates. The piston head 59 is bored to receive a piston rod 60, secured thereto by the nut 61 threaded upon the right-hand end thereof. A port 62 serves for the admission and discharge of fluid from the opposite end of the cylinder bore 58. Packings 63 and 64, closed by the gland 65, serve to prevent the escape of fluid around the piston rod 60.

On the piston rod 60 is mounted an annular cam 66 for actuating certain limit switches, hereinafter described. To the left of the cam 66 the piston rod 60 is reduced in diameter to form an injection plunger 67, which passes through a sleeve 68 mounted in the bore 69 of the cross member 12, and terminating at its opposite end in a bore 70 of an injector, generally designated 71. Beyond the bore 70 the injector is enlarged to form a chamber 72, containing the bored supporting portion 73 of a spindle-shaped diverting member 74 for diverting the plastic material therearound. Beyond the member 74 the injector chamber 72 is threaded, as at 75, to receive a nozzle 76 having a conical wall 77 and an outlet passage 78. The nozzle 76 is also provided with a protuberance 79 of corresponding configuration to the socket 40, and adapted to mate therewith when the die head 15 and die support 38 are moved into engagement therewith.

The injector 71 is provided with radiating fins 80, arranged within a heating chamber 81 having a cylindrical wall 82 with a port 83 therethrough (Figure 2). The wall 82 is surrounded by a heat-insulating layer 84 for retaining the heat within the chamber 81. The injector 71 is heated by a suitable fluid, such as hot oil, admitted thereto through the port 83 and discharged through the opposite port 85, at the opposite end thereof. The injector 71 is provided with a flanged portion 86, engaging a heat-insulating disc 87, which in turn, engages the flanged portion 88 of the cross member 12. This flanged portion 88 is joined to a neck portion 89 containing an annular chamber 90, with entrance and exit ports 91 and 92. The purpose of this chamber 90 is to provide for the circulation of cooling fluid to prevent the premature softening of the plastic material and the consequent clogging of the feeding mechanism, hereinafter described. The heat-insulating disc 87 cooperates with the cooling chamber 90 to prevent the transmission of heat from the flanged portion 86 of the flanged portion 88.

*Feeding mechanism*

The feeding and injection mechanisms are shown in enlarged detail in Figure 3. The sleeve 68 is provided with an aperture 93, aligned with the mouth of an inclined feeding cylinder bore 94 within the cross member 12. An inlet passage 95 opens into the upper end of this bore 94, and serves to carry the granulated plastic molding material thereto from the hopper 96. The latter is provided with a cover 97, hinged as at 98.

Mounted for rotation in the cylinder bore 94 is a feeding screw 99, connected by the shear pin 100 within the socket 101 of the shaft 102 (Figure 3). The latter is mounted upon anti-friction bearings 103 and 104 and carries a bevel gear 105, meshing with a similar bevel gear 106 upon the cross shaft 107 leading into the gear box 108 of the motor 109. The gears 105 and 106 are arranged within a casing 110, mounted upon the bracket 111, which in turn is secured to the cross member 12. The bored plate 112 serves to close the casing 110 and surrounds the shaft 102, the escape of fluid being prevented by the packing 113.

The motor 109 and gear box 108 form a reduction unit, together with the shaft 107 and bevel gear 106, and are separable from the casing 110 to which they are bolted. The bevel gears 105 and 106, together with the construction of the motor 109 and gear box 108, previously described, serve to permit the placing of the motor 109 in a convenient position for mounting and also make it possible to remove the screw assembly without disturbing the motor.

Mounted upon a bracket 114, secured to the lower portion of the cross member 12 (Figure 3), is a sliding plate 116ᵃ which may be moved to the right or to the left in order to adjust its position. Mounted upon the bracket 114 is a limit switch 115, a second limit switch 116 being mounted upon the sliding plate 116ᵃ. The limit switches 115 and 116 are provided with rollers 117 and 118 for actuating and closing the switches when they are engaged by the cam 66. The switches 115 and 116 are of a normally open type, which close the circuit when their rollers 117 and 118 are depressed. The electrical connection of these limit switches is subsequently to be described. The operation of the machine as a whole will be discussed after the description of the electrical system.

*Electrical feed actuating system*

Figure 6:
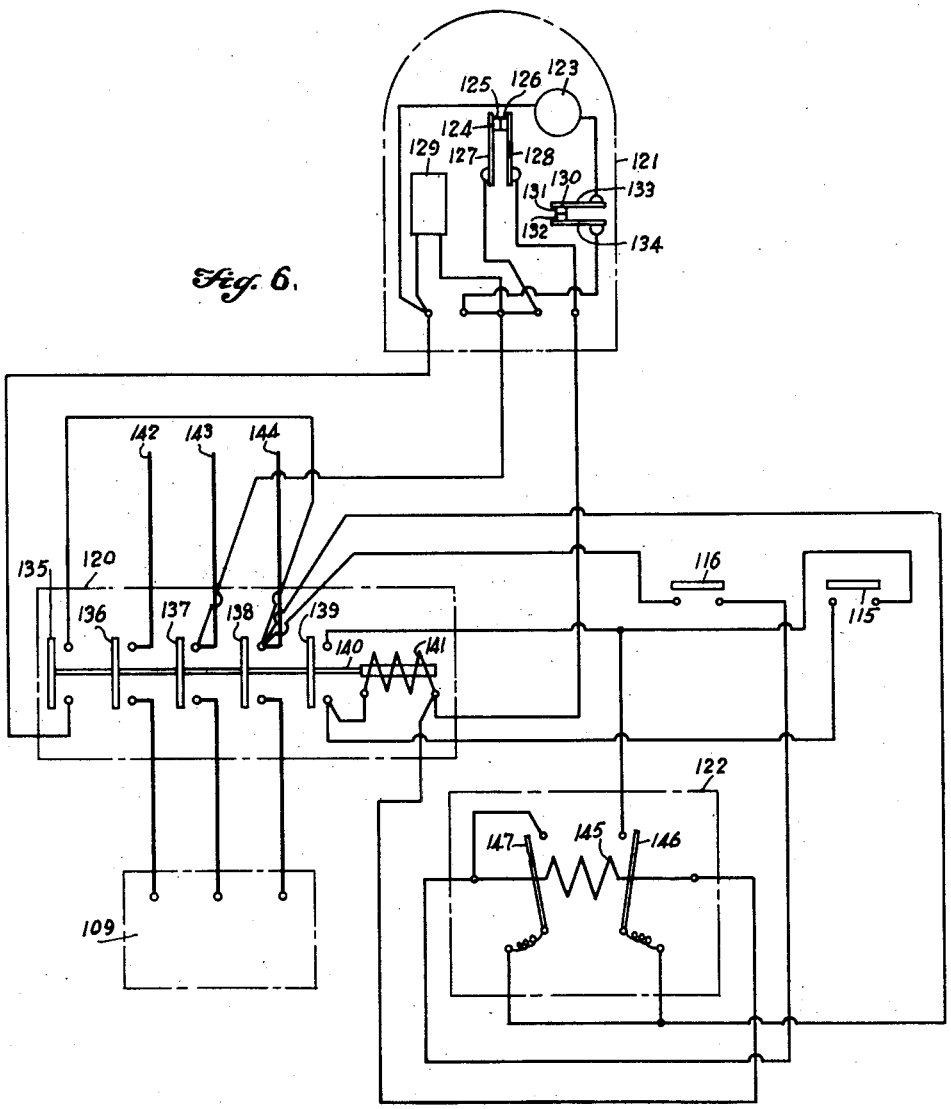
Figure 6 is a wiring diagram showing the electrical elements and circuit for actuating the feeding mechanism.

The feed-operating circuit (Figures 6 and 7) includes a five-pole motor starting switch 120, a timing switch 121, a two-pole magnetic contactor switch 122 and the limit switches 115 and 116. The timing switch 121 has a timing motor 123 which, after an adjustably variable predetermined time, opens the contacts 125 and 126 of the main contact assembly 124 on the switch arms 127 and 128. A coil 129 operates a clutch (not shown) interconnecting the timing motor 123 with the contact operative mechanism. The auxiliary contact assembly 130, with contacts 131 and 132 on arms 133 and 134, is opened by the motor 123 at the end of a predetermined maximum time cycle, and protects the circuit in the event of the failure of the contact assembly 124 to open.

The five-pole motor starting switch 120 contains five switch blades 135 to 139, inclusive, mounted upon an armature rod 140 adapted to be operated by the operating coil 141 when the latter is energized. The switch blade 139 serves as an interlock or holding switch so as to maintain the energization of the operating coil 141 when the limit switch 115 is opened, after its release by the cam 66. The switch blades 136, 137 and 138 serve to conduct electricity from the power lines 142, 143 and 144 to the feeding motor 109. The two-pole magnetic contactor switch 122 is provided with an operating coil 145, which when energized is adapted to close two normally open switch blades 146 and 147, respectively. The switch blade 147 serves as an interlock switch for closing the holding circuit to maintain the energization of the operating coil 145 when the second limit switch 116 is opened after its release by the cam 66.

In the operation of the electrical control system, let it be assumed that the injecting plunger 67 executes an injection-stroke and consequently moves the cam 66 into engagement with the roller 118 (Figure 3), and closes the second limit switch 116. When this occurs (Figure 7), the operating coil 145 of the two-pole magnetic contactor becomes energized through the timing switch assembly 124 and from the line 143 to the line 144. With the closing of the magnetic contactor switch 122, the switch blade 147 thereof likewise closes, and completes a holding circuit for the operating coil 145, even when the limit switch 116 is released by the return stroke of the plunger. As the plunger returns to its retracted position, the cam 66 depresses the roller 117 of the limit switch 115, and causes the circuit to be closed between the lines 143 and 144 by way of the previously closed magnetic contactor blade 146, the limit switch 115 (Figure 7), the operating coil 141 of the motor starting switch 120 and the contacts 124 of the timing switch 121. The coil 141, thus energized, causes the motor starting switch 120 to close so that its five switch blades interconnect their corresponding poles. The closing of the switch blade 135 serves to energize the timing motor 123 of the timing switch 121, and causes it to begin its cycle of operations. The closing of the switch blades 136, 137 and 138 causes the feeding motor 109 to be energized from the power lines 142, 143 and 144. The closing of the final switch blade 139 operates a holding circuit to maintain the coil 141 in an energized condition, even when the limit switch 115 is released.

Figure 7:
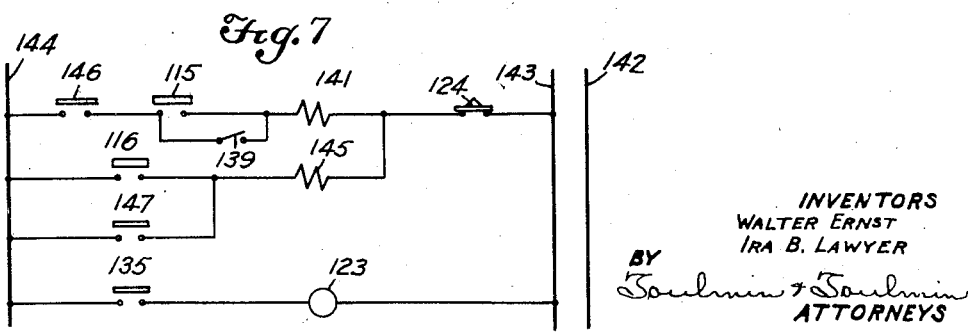
Figure 7 is a simplified wiring diagram of the feed-actuating circuit shown in Figure 6.

After the electrical timing switch 121 has run its course for the predetermined time for which it has been set, the circuit is opened at the timing switch contacts 124 (Figure 7). This action deenergizes the operating coils 141 and 145 of the motor starting switch 120 and magnetic contactor switch 122, causing the switch blades of both switches to disengage their respective contacts and open the circuits controlled thereby. The consequent opening of the magnetic contactor switch blade 135 (Figure 7) deenergizes the timing motor 123 and resets the timing device for another cycle of operations. This cycle of operations is repeated when the injection plunger executes another working stroke and returns to its original position, thereby again actuating the limit switches 115 and 116.

Under these conditions the timing switch has been so adjusted that the motor will run for a sufficient length of time to inject into the chamber 70 slightly more than the correct amount of material. This slight over-feeding prevents a scarcity of material and accordingly the injection plunger 67, after several strokes, is incapable of completing a working stroke on account of the piling up of material within the bore or chamber 70. When this happens the cam 66 does not move sufficiently far to the left to close the limit switch 116 so that the circuit which energizes the magnetic contactor switch 122 is not completed. When the plunger returns to its starting position and the cam 66 closes the limit switch 115, under such conditions no energization of the operating coils 141 and 145 takes place, hence, the motor 109 fails to operate to actuate the feed screw 99. On the next stroke of the plunger 67 the excessive quantity of material will be injected into the dies, thereby relieving the surplus quantity in the injection bore 70. The plunger 67 then travels sufficiently far to the left to close the limit switch 116, and the complete cycle of operations is again carried out.

*Hydraulic circuit*

The central bore 19 of the booster plunger 17 is provided with an outlet port 150, from which a pipe 151 runs to a die-clamping valve 152 (Figure 1). From the pipe 151 a branch 153 runs to a platen-operated valve 154, from which a return line 155 runs to the inlet port 156 of the main cylinder bore 20. The latter is also provided with a port 157, from which a line 158 runs to a check valve 159, a line 160 continuing therefrom to the oil reservoir or tank 161. The check valve 159 is provided with a chamber 162 within which a pawl 163 engages a seat 164 to permit the flow of fluid solely in the direction of the reservoir 161 to the main cylinder bore 20. From the line 151 a branch line 165 runs to a leakage pump 166, the suction line 167 therefrom running to the tank 161.

From the piston valve 152 the pressure line 168 runs to the main pump 169, the suction line 170 running therefrom to the tank 161. The pressure line 168 contains a check valve 171 for permitting the flow of fluid solely in the direction from the pump 169 to the valve 152, and not in the reverse direction. From the valve 152 the line 172 runs to a port 173 leading into the opposite end of the main cylinder 20 from the port 156. A branch line 174 with a manually operated valve 175 runs from the line 172 to the port 56 in the cylinder bores 47, thereby admitting and discharging fluid from the space to the left of the pistons 52. Similarly, a line 176 runs from the line 168 immediately preceding the check valve 171 to the ports 55 in the cylinder bores 53, thereby admitting or discharging fluid to and from the space to the right of the pistons 52. An oil line 177 runs by way of a heater (not shown) to the heating chamber 81 of the injector 71, and to a second line 178 conveying fluid away from this chamber. Cooling conduits 179 and 180 serve to convey a cooling fluid to and from the cooling passage 90, around the entrance to the injection chamber 70.

Running from the valve 152 is a line 181 leading to the injector operating valve 182. A line 183 with a manually operated valve 184 serves to interconnect the lines 174 and 181. From the valve 182 the lines 185 and 186 run to the ports 62 and 57, respectively, on the left and right-hand sides of the injector piston 59. The remaining line 187 runs from the injector operating valve 182 to the line 168 on the opposite side of the check valve 171 from the die-clamping valve 152.

General operation

In order to start the operation of the machine by clamping the dies 29 and 30 together, the hydraulic pumps 166 and 169 are started in operation, thereby generating fluid pressure which is transmitted to the lines 165 and 168, respectively. The die-clamping valve 152, which is preferably of the piston type, is shifted by the operator so that fluid passes from the line 168, through the check valve 171 and out the line 151, where it is augmented by pressure fluid from the leakage pump 166. The fluid continues onward and enters the port 150, proceeding into the bore 19 of the booster plunger 17, where it acts against the end of the internal bore 22 within the main plunger 21, causing the latter to move rapidly to the right, carrying with it the die carrier 14 and the die 29.

As the main plunger 21 advances fluid is drawn through the check valve 159 and line 160 from the tank 161. It will be understood, however, that the check valve 159 may be immersed in the tank 161. This fluid is drawn into the space within the cylinder bore 20 to the left of the main plunger 21, causing this space to be filled with oil. When the main plunger 21 advances to a predetermined position, the die carrier 14 engages a control rod 154ª, which shifts the valve 154 when the two dies 29 and 30 are almost together. The shifting of the valve 154 admits pressure, through the line 153, the valve 154, the line 155 and the port 156 to the left-hand end of the main cylinder 20, acting against the end of the main plunger 21 and causing the full force of the plunger to be exerted against the dies 29 and 30. The die assembly continues to move to the right, pushing the die head 15 and the rods 43 to the right until the socket 40, leading to the die 30, is firmly pressed against the tip 79 of the injection nozzle 76 (Figures 1 and 2). The full force of the main plunger 21 is not exerted against the nozzle 76, however, because the die head 15 is now cushioned against the pistons 52 as soon as they are engaged by the enlarged heads 51 of the plungers 43. This engagement takes place slightly before the nozzle 76 is engaged by the socket 40.

Meanwhile, pressure fluid has been flowing through the line 176 to the ports 55 leading into the cylinder bores 53, thereby tending to force the piston heads 52 to the left. In this manner the pistons 52 combine to oppose the pressure exerted by the main plunger 21. The force exerted by the pistons 52 does not subtract from the total force used to clamp the dies 29 and 30, but merely reduces the force exerted against the end of the nozzle 76. Since the pistons 52 are not connected to the plungers 43, the latter travel rapidly until they engage the former. This construction, moreover, permits the use of a small travel of the die 30 which engages the nozzle 76, hence, saves time inclosing the dies 29 and 30. Obviously, a saving in the time of closing the dies operates to save time in the opening thereof.

With the dies 29 and 30 now closed and in engagement with the injector nozzle 76, the injector operating valve 182 is shifted to admit pressure from the line 181, into the line 186 and port 57 leading into the cylinder bore 58 to the right of the piston head 59. This forces the piston 59, piston rod 60 and injection plunger 67 to the left in an injection stroke, thereby filling the dies with plastic material. The electrical control system for the feeding apparatus of the injector operates in the manner previously described, in response to the engagement of the limit switches 115 and 116 (Figure 3) by the cam 66 on the injection plunger 67.

When the piston 52 first starts to move it encounters a comparatively low resistance, hence, this causes a drop in pressure in the lines 186 and 187 leading to the line 168. The check valve 171, however, prevents this drop in pressure from reaching the line 151, running to the main plunger 21, thereby insuring that full pressure is applied for clamping the dies. At this point the leakage pump 166 comes into operation for supplying the small volume of pressure fluid required to take care of any leakage which occurs past the main plunger 21 while the pump 169 is not supplying pressure fluid to the main plunger 21.

After a charge of plastic material has been forced into the cavities of the dies 29 and 30, the injector operating valve 182 is again shifted so that pressure fluid is admitted through the line 185 to the space on the left-hand side of the piston 59, thereby returning the injector plunger 67 to its retracted position. At this point additional material is fed into the injector chamber by the feed screw 99, in accordance with the electrical operation previously described.

After a sufficient time has elapsed for the material to cool in the dies, the die-clamping valve 152 is shifted to its opposite position so that pressure fluid is discharged from the line 168, through the valve 152, the line 172 to the port 173, into the space at the right-hand end of the main cylinder bore 20, returning the main plunger 21 to its starting position and separating the die halves 29 and 30. As the die carrier 14 reaches its retracted position, the knock-out rods 33 and knock-out bar 32 operate to cause the pins 34 to eject the work-piece from the die.

It will be understood that we desire to comprehend within our invention such modifications as come within the scope of the claims and the invention.

Having thus fully described our invention, what we claim as new and desire to secure by Letters Patent, is:

1. In a material-supplying device for a plastic molding machine, an injector for plastic material having an elongated chamber and an injector plunger operable therein, a feeding chamber disposed obliquely of said injector chamber and opening therein, and a feeding screw rotatable in said obliquely disposed chamber at an oblique axis relatively to the axis of said injector plunger for positively feeding molding material to said injector.

2. In a material-supplying device for a plastic molding machine, an injector for plastic material having an elongated chamber and an injector plunger operable therein, a feeding chamber disposed obliquely of said injector chamber and opening into said injector chamber near the end of said injector plunger in its retracted position, and a feeding screw rotatable in said obliquely disposed chamber at an oblique axis relatively to the axis of said injector plunger for positively feeding molding material to said injector.

3. In a material-supplying device for a plastic molding machine, an injector for plastic material having an injector chamber and an injector plunger operable therein, means for supplying molding material to said chamber, a feeding chamber connected to said injector chamber and extending between said supplying means and injector chamber, a feeding member movable in said feeding chamber for forcefully feeding material from said supply means to said injector chamber, a motor connected to said feeding member, and adjustable timing means for effecting the operation of said feeding member motor for periods of time of a predetermined duration whereby to feed a corresponding predetermined quantity of molding material to said injector chamber.

4. In a material-supplying device for a plastic molding machine, an injector for plastic material having an injector chamber and an injector plunger operable therein, means for supplying molding material to said chamber, a feeding chamber connected to said injector chamber and extending between said supplying means and injector chamber, a feeding member movable in said feeding chamber for forcefully feeding material from said supply means to said injector chamber, a motor connected to said feeding member, adjustable timing means for effecting the operation of said motor for periods of time of a predetermined duration, and means responsive to the motion of said injector plunger for initiating the operation of said timing means whereby to feed a corresponding predetermined quantity of molding material to said injector chamber for a stroke of said injector plunger.

5. In a material-supplying device for a plastic molding machine, an injector for plastic material having an injector chamber and an injector plunger operable therein, means for supplying molding material to said chamber, a feeding chamber connected to said injector chamber and extending between said supplying means and injector chamber, a feeding member movable in said feeding chamber for forcefully feeding material from said supply means to said injector chamber, an electric motor connected to said feeding member, and electrical means responsive to a predetermined motion of said injector plunger for energizing said electric motor a predetermined period of time to move said feeding member a predetermined amount whereby to feed a predetermined quantity of molding material to said injector chamber for a stroke of said injector plunger, said electrical means being arranged to energize said motor for such period of time as to feed a slightly excessive quantity of molding material to said injector chamber per stroke of said injector plunger, said electrical means and said motor being arranged to remain temporarily unenergized after an incomplete stroke of said injector plunger resulting from the accumulation of molding material in said injector chamber exceeding a predetermined quantity.

6. In a material-supplying device for a plastic molding machine, an injector for plastic material having an injector chamber and an injector plunger operable therein, means for supplying molding material to said chamber, a feeding chamber connected to said injector chamber and extending between said supplying means and injector chamber, a feeding member movable in said feeding chamber for forcefully feeding material from said supply means to said injector chamber, an electric motor connected to said feeding member, and electrical means for moving said feeding member a predetermined amount for feeding a predetermined quantity of molding material to said injector chamber slightly in excess of the capacity thereof, said electrical means being energizable solely in response to the substantial completion of a full working stroke of said injector plunger and adapted to remain deenergized upon an incomplete working stroke thereof by reason of the temporary accumulation of an excessive quantity of molding material in said injector chamber whereby to constantly insure an adequate supply of molding material for said injector chamber by temporarily rendering said feeding member inoperative.

7. In a material-supplying device for a plastic molding machine, an injector for plastic material having an injector chamber and an injector plunger operable therein, means for supplying molding material to said chamber, a feeding chamber connected to said injector chamber and extending between said supplying means and injector chamber, a feeding member movable in said feeding chamber for forcefully feeding material from said supply means to said injector chamber, electrical means for moving said feeding member, an electric circuit connected thereto, and a limit switch connected in said circuit, said limit switch being operatively engageable by said injector plunger for controlling the energization of said circuit.

8. In a material-supplying device for a plastic molding machine, an injector for plastic material having an injector chamber and an injector plunger operable therein, means for supplying molding material to said chamber, a feeding chamber connected to said injector chamber and extending between said supplying means and injector chamber, a feeding member movable in said feeding chamber for forcefully feeding material from said supply means to said injector chamber, an electric circuit connected thereto, time-responsive means for operating said feeding member a predetermined time, and a limit switch responsive to the motion of said injector plunger for controlling the energization of said circuit.

9. In a material-supplying device for a plastic molding machine, an injector for plastic material having an injector chamber and an injector plunger operable therein, a feeding chamber connected to said injector chamber, a feeding member movable in said feeding chamber, means for supplying molding material to said feeding member, electrical means for moving said feeding member, an electric circuit connected thereto, time-responsive means for operating said feeding member a predetermined time, and a plurality of switches operated by the motion of said injector plunger for controlling the energization of said circuit, said switches being operated by said plunger at separated locations.

10. In a material-supplying device for a plastic molding machine, an injector for plastic material having an injector chamber and an injector plunger operable therein, a feeding chamber connected to said injector chamber, a feeding member movable in said feeding chamber, means for supplying molding material to said feeding member, electrical means for moving said feeding member, an electric circuit connected thereto, time-responsive means for operating said feeding member a predetermined time, and a plurality of switches operated by the motion of said injector plunger for controlling the energization of said circuit, said switches being operated by said plunger at separated locations, said time-responsive means being arranged to feed to said injector chamber a quantity of material slightly in excess of the capacity thereof, one of said switches being inoperable by said plunger when the accumulated material exceeds a predetermined quantity whereby to render said feeding circuit temporarily inoperative during the motion of said plunger in injecting said excessive quantity into said die.

WALTER ERNST.
IRA B. LAWYER.